United States Patent [19]

Hessing et al.

[11] Patent Number: 5,276,564
[45] Date of Patent: Jan. 4, 1994

[54] PROGRAMMABLE START-OF-SECTOR PULSE GENERATOR FOR A DISK DRIVE USING EMBEDDED SERVO BURSTS AND SPLIT DATA FIELDS

[75] Inventors: Charles E. Hessing; Boyd N. Shelton; Robert K. Barnes, all of Boise, Id.

[73] Assignee: Hewlett-Packard Company, Palo Alto, Calif.

[21] Appl. No.: 869,602

[22] Filed: Apr. 16, 1992

[51] Int. Cl.⁵ .............................................. G11B 5/09
[52] U.S. Cl. ........................................ 360/51; 360/49
[58] Field of Search ....................... 360/51, 48, 49, 50, 360/77.03, 77.04, 77.08, 39, 40; 369/32

[56] References Cited

U.S. PATENT DOCUMENTS

| | | | |
|---|---|---|---|
| 4,757,406 | 7/1988 | Stewart et al. | 360/51 |
| 4,918,677 | 4/1990 | Ashinuma et al. | 369/32 |
| 5,130,863 | 7/1992 | Yamashita et al. | 360/48 |
| 5,164,866 | 11/1992 | Sano et al. | 360/77.08 |

*Primary Examiner*—Robert J. Pascal
*Assistant Examiner*—Ali Neyzari
*Attorney, Agent, or Firm*—E. F. Oberheim

[57] ABSTRACT

A disk drive system employs uniform size data blocks, with each disk having a sectorized track format and each sector of a track including at least one servo burst. Data blocks exhibit a constant data density across a plurality of disk tracks of differing radii. The system comprises read/write apparatus for accessing both servo signals and data signals in each disk sector. A servo system is responsive to servo signals fed from the read/write apparatus to generate a synchronizing signal. A data sector pulse generation circuit is responsive to the synchronizing signal to generate and pass to the read/write apparatus, a data sector pulse for each block of data commencing in a sector. That data sector pulse enables operation of the read/write apparatus upon the data block. A control circuit enables the delay of generation of a next data sector pulse when any block of data is split by a servo burst. The delay period is the duration of the servo burst and the portion of the data block that follows the servo burst.

7 Claims, 4 Drawing Sheets

PROGRAMMABLE START-OF-SECTOR PULSE GENERATOR FOR A DISK DRIVE USING EMBEDDED SERVO BURSTS AND SPLIT DATA FIELDS

FIELD OF THE INVENTION

This invention relates to disk drives that employ split data fields with embedded servo bursts and, more particularly, to apparatus for generating start of data sector pulses within such disk drives.

BACKGROUND OF THE INVENTION

Present day disk drives employ a number of servo techniques for controlling transducer positioning. Larger form-factor disk drives employ a dedicated servo surface on one disk platter to enable the generation of signals for servo control of read/write head position. In such larger disk drives, this servo signal generation technique is practical since most of those drives contain multiple platters, yielding many recording surfaces. The dedication of one surface to servo signals subjects the disk drive to a minimal "servo overhead".

Smaller form-factor disk drives (e.g., 3.5 inches or smaller) generally contain only one or two disks. In such a drive, if one surface of a disk is dedicated solely to servo information, the overhead can be as high as 50%—which is unacceptable. To minimize servo overhead in the smaller disk drives, servo information has been embedded into the data tracks and is distributed throughout each track. Since servo and data fields are thereby contiguous, differentiation between them becomes critical to the proper operation of the disk drive.

Before a disk drive can be operated to store data, the disks must be formatted. Such formatting involves the partitioning of each recording surface into a plurality of pie-shaped sectors, each sector including a single servo burst. Since each disk track has a different linear velocity from every other track on the disk, signals written at a constant frequency do not exhibit a constant data density from track to track. For instance, a servo burst written at a constant frequency in a sector of an inner track will occupy less linear distance on the inner track than a constant frequency servo burst written on a more radially distant outer track. Nevertheless, servo bursts are written using constant frequency signals across the tracks. In such a case, radially aligned servo bursts occupy different linear distances in their respective tracks, but radially aligned servo bursts occupy an identical time window in each track (the angular velocity of each track is identical). Thus, a timing signal generated to window a servo burst and various signal segments therein can be made the same for each track, irrespective of the radial distance of the track from a disk's spindle axis.

If constant frequency recording is used for data, as it is for servo bursts, the density of data in outer tracks is much less than for data in inner tracks and the resultant storage efficiency of the disk drive suffers. Many hard-disk disk drives therefore employ a method of recording termed "constant density" recording. More specifically, data is written in each track (or in a zone of tracks) so that the signal density is constant across all tracks in a zone. As a result, the frequency of recording of such data in greater radius tracks is higher than the frequency of recording in the more radially-inner tracks.

The prior art has employed two techniques to implement constant density recording. The first method varies the rotational speed of the disk and senses data at a constant data rate. The second technique maintains the rotational speed of the disk constant while increasing the recording rate as tracks approach the outer edge of a disk. The first method has been used in floppy disk drives, but in hard disk drives, it is difficult to vary the disk rotation speed. Therefore, hard disk drives typically use (as aforestated) different recording rates for different zones of tracks, depending upon the location of the track on the disk.

Prior art disk drives using embedded servo bursts have generally appended only a single data field to the servo burst. By knowing the duration of the servo burst, the position of a data field can be determined and the read/write circuitry properly enabled. A problem with the single data field/servo burst configuration is that the recording density on outer tracks suffers if constant size data blocks are employed.

Accordingly, it is an object of this invention to provide a disk drive employing embedded servo bursts with an ability to commence a data sector at any point within the data portion of a disk track.

It is another object of this invention to provide a disk drive employing embedded servo bursts with an ability to split data fields so that they appear in different disk sectors.

It is yet another object of this invention to provide a disk drive employing embedded servo bursts, with circuitry that generates start of data sector pulses at the commencement of each data sector, irrespective of whether a data sector is complete or split.

SUMMARY OF THE INVENTION

A disk drive system employs uniform size data blocks, with each disk having a sectorized track format and each sector of a track including at least one servo burst. Data blocks exhibit a constant data density across a plurality of disk tracks of differing radii. The system comprises read/write apparatus for accessing both servo signals and data signals in each disk sector. A servo system is responsive to servo signals fed from the read/write apparatus to generate a synchronizing signal. A data sector pulse generation circuit is responsive to the synchronizing signal to generate and pass to the read/write apparatus, a data sector pulse for each block of data commencing in a sector. That data sector pulse enables operation of the read/write apparatus upon the data block. A control circuit enables the delay of generation of a next data sector pulse when any block of data is split by a servo burst. The delay period is the duration of the servo burst and the portion of the data block that follows the servo burst.

DETAILED DESCRIPTION OF THE INVENTION

Figure 1:
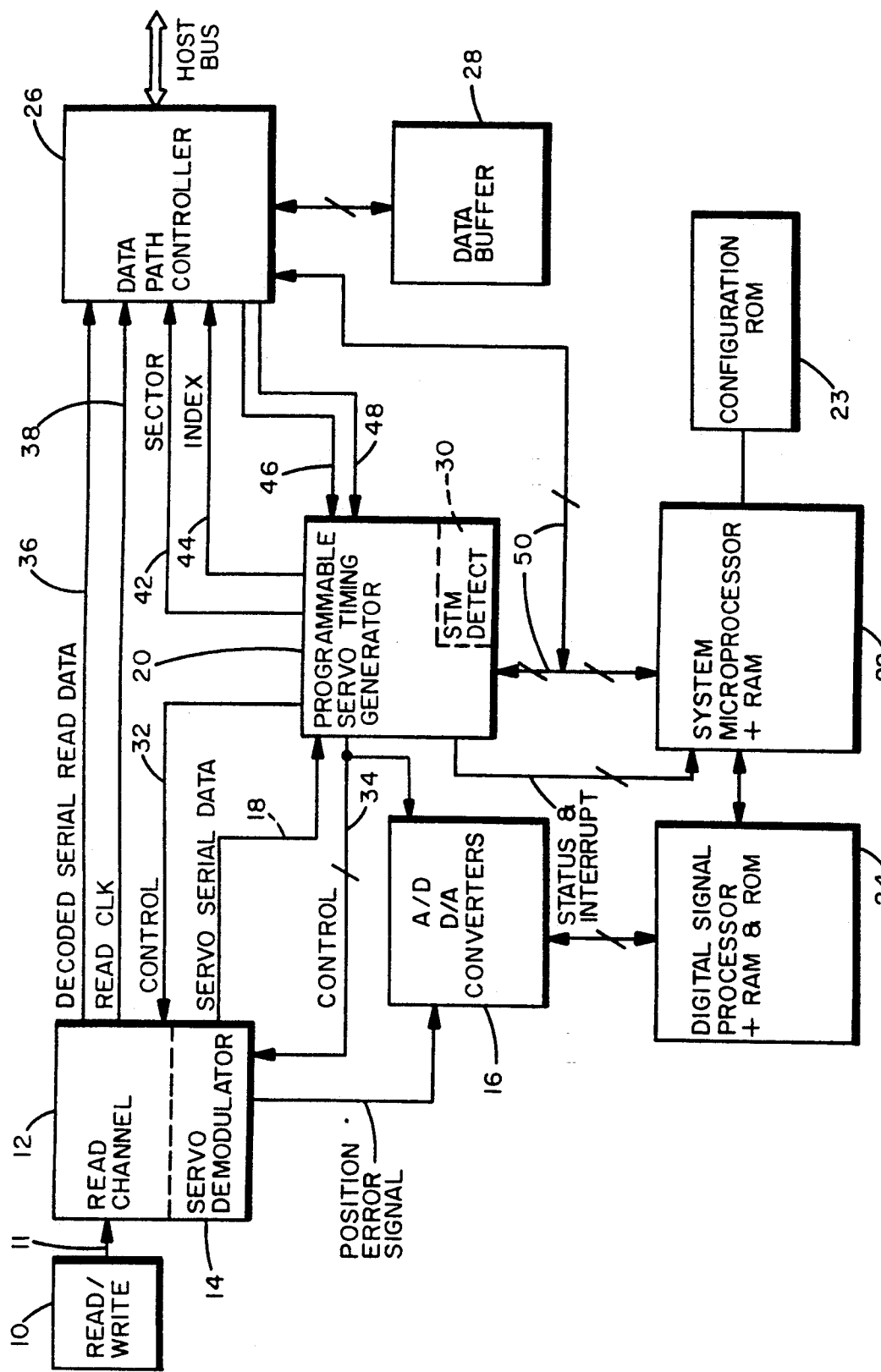
FIG. 1 is a block diagram of a portion of a disk drive system that incorporates the invention.

Referring now to FIG. 1, a block diagram illustrates a portion of the control circuitry for a hard-disk disk drive. A read/write apparatus 10 detects analog data from a disk (not shown) and feeds it via line 11 to read channel 12. Write circuitry is also connected to read/write apparatus 10 but is not shown to prevent over complication of the drawing of FIG. 1.

Signals sent to read channel 12 from read/write apparatus 10 include both embedded servo burst signals and data signals. It will be recalled that the servo bursts in each track are written at a constant frequency and thereby occur in a predetermined time period, irrespective of track radius. By contrast, data signals are written at a constant density and thus consume more or less time, per unit of data, in dependence on the particular track or zone of tracks that are being read/written.

Read channel 12 includes a servo demodulator module 14 which, upon command, demodulates servo burst signals appearing on line 11. Those demodulated signals enable the generation of a position error signal which is fed to analog-to-digital (A/D), digital-to-analog (D/A) converter 16. Read channel 12 provides to the data path controller 26 via lines 36 and 38 a decoded serial data stream and associated synchronized clock. The data path controller 26 uses the read clk 38 to sample the decoded serial data stream 36 and to de-serialize the data and collect it in byte/word format for further processing and eventual delivery to the host bus. Additionally, read channel 12 provides to the servo timing generator 20 via line 18 the servo serial data. This servo serial data 18 is required to have a fixed timing relationship to the di-bits read from the disk. The servo serial data 18 is essential to the operation of the programmable servo timing generator and is used to synchronize its operation to the disk servo format. Once synchronized to the disk servo format the programmable servo timing generator 20 generates control signals 34 which are required to control the servo demodulator 14 and the A/D convertors 16. The operation of programmable servo timing generator 20 is controlled by a program that is loaded from system microprocessor 22. Microprocessor 22 also controls a digital signal processor 24 that, in turn, controls the operation of A/D, D/A converter 16.

Connected to system microprocessor 22 is a "configuration" read only memory (ROM) 23. Configuration ROM 23 contains, a configuration table for each track (or zones of tracks), the configuration table contains the following information: the number of system clock cycles in the portion of each split data block that follows a servo gap and the number of start of data sector (SODS) pulses in each servo sector within the rack. Configuration ROM 23 is addressed by system microprocessor 22 feeding it the zone number (or track number) and servo sector number where a desired data block is to be read or written. In response, configuration ROM 23 returns the number of SODS pulses in the addressed servo sector and the number of system clock cycles in the portion of each split data block that follows a servo gap. In addition to this information the hardware to be discussed also requires knowledge of the number of system clock cycles contained within a non-split data block. This information is contained in a zone configuration table within the ROM 23 and is accessed when zone changes occur within the disk drive. Zone changes occur when the disk drive is required to access data outside the current recording zone.

Data from ROM 23 are used to generate SODS pulses that indicate to the rest of the disk drive when a read or write action should commence. More specifically, a SODS pulse will be generated at the beginning of each data block to enable proper gating of data either to or from the disk surface. As will be hereafter seen, circuitry is provided which enables a SODS pulse to be generated both when an entire data block is present between servo bursts and when a data block is split by an intervening servo burst.

Programmable servo timing generator 20 forms the synchronization heart of the disk drive system. It provides outputs to each of the system modules, including data path controller 26 to enable synchronization of the operation of each module with the incoming disk analog signals. In brief, programmable servo timing generator 20, upon receiving a series of signals over line 18 from read channel 12 and, upon being instructed to commence a read cycle by microprocessor 22, begins by looking for a sector timing mark (STM). An STM is embedded in each servo burst and is an encoded signal that is used to provide synchronization of the read/write circuitry with signals emanating from a disk surface.

An STM is detected by a match in an STM detect circuit 30 within programmable servo timing generator 20. Upon such detection, programmable servo timing generator 20 issues a set of timing signals that control operation during the read cycle.

At such time, circuitry within programmable servo timing generator 20 begins issuing timing commands that enable the generation of timing signals and windows. For instance, a timing window is transmitted via line 34 to servo demodulator 14 to enable fine servo control fields to be windowed and then transferred to A/D, D/A converters 16 for subsequent passage to digital signal processor 24.

Sector and index synchronizing pulses are generated within programmable servo timing generator 20 and are provided over lines 42 and 44, respectively, to data path controller 26. A sector pulse on line 42 indicates the beginning of a sector within a track and an index pulse on line 44 indicates the beginning of a track. Lines 46 and 48, emanating from data path controller 26, instruct programmable servo timing generator 20 as to whether the system is in a read or write state.

As above indicated, data blocks are written to disk using a constant density recording technique. Therefore, a data block in each track (or zone of tracks) will occupy a different window of time, in dependance upon the track's circumferential speed. Means are thereby required to identify the beginning of each data block in each track sector, whether the data block is split by a servo burst or not.

Programmable servo timing generator 20 includes circuitry which generates timing windows over control lines 32 and 34 to read channel 12 and servo demodulator 14, respectively. The timing window sent via control line 32 gates read channel 12 during the data portion of a track (between servo bursts) and enables the transfer of data signals, via line 36, to data path controller 26. That timing window is derived from the sector timing mark. Hereafter, that signal will be termed the GAP window which, when asserted indicates that signals from read/write apparatus 10 are in the servo burst of a sector, and when de-asserted indicates that the signals correspond to data. The GAP window is also employed to enable further control circuitry that generates start of data sector (SODS) pulses that identify the initiation of data blocks.

Figure 2:
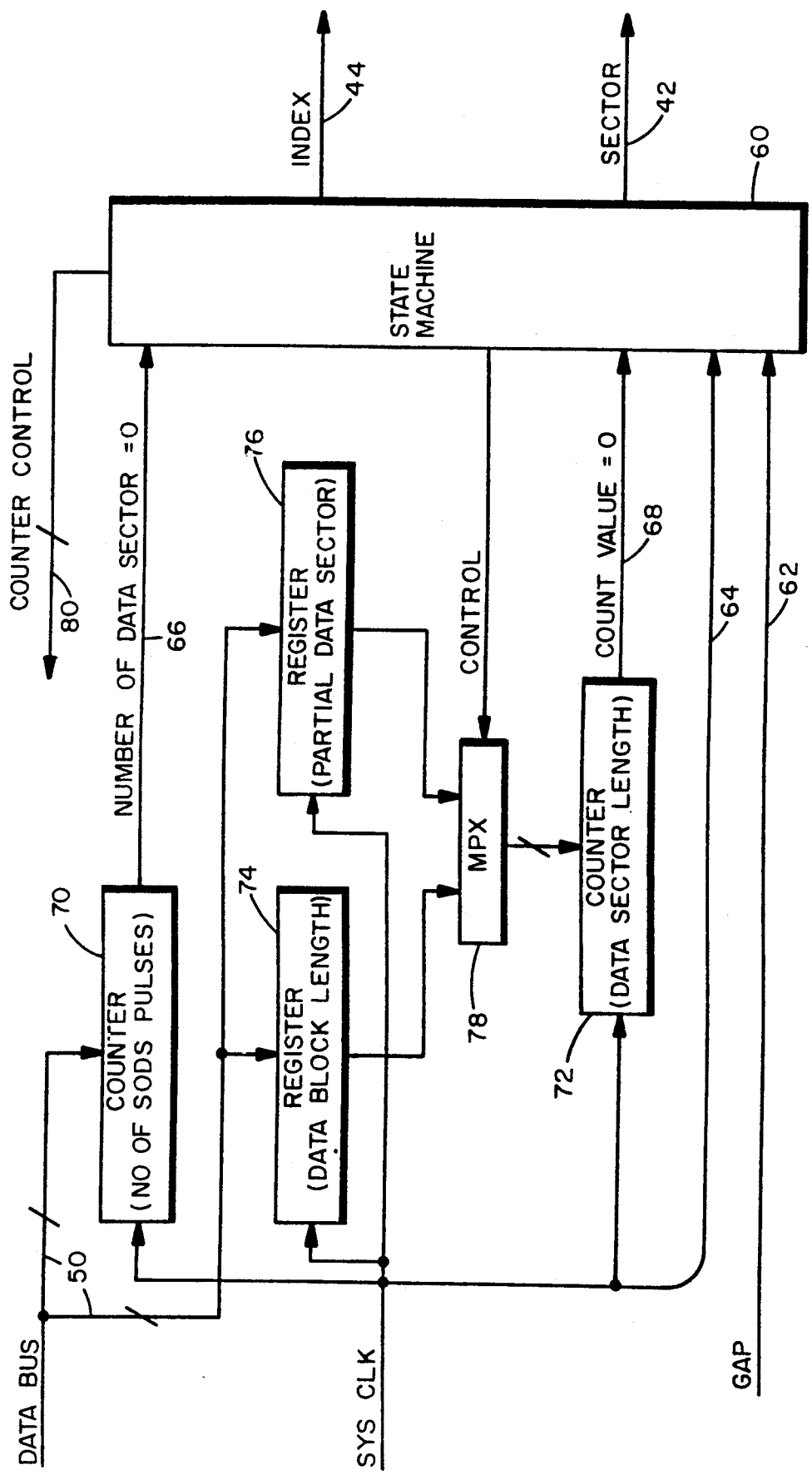
FIG. 2 is a block diagram of circuitry for generating data sector pulses, which circuitry exists within the programmable servo timing generator shown in FIG. 1.

Referring to FIG. 2 further details of programmable servo timing generator 20 are shown. A state machine 60 provides sector pulses and an index pulse on output lines 42 and 44, in response to a plurality of inputs. Inputs to state machine 60 are the aforementioned GAP window applied over line 62; system clock (sys clk) pulses as applied over line 64; and outputs from a pair of counters 70 and 72, via lines 66 and 68 respectively. A pair of data length registers 74 and 76 feed their outputs to a multiplexer 78 whose output is, in turn, fed to counter 72. State machine 60 controls, via multiplexer 78, whether the output from register 74 or register 76 is fed to counter 72. A control bus 80 emanates from state machine 60 and is employed to control and gate the actions of the various counters and registers shown in FIG. 2, but its specific connections are not shown to avoid over complicating the view.

When a particular sector and track is addressed, data from configuration ROM 23 (FIG. 1) is loaded into counter 70 and register 74, via system data bus 50. Counter 70 is loaded with a value that is equal to the number of SODS pulses within the addressed sector. Register 74 is loaded with a value equal to the length, in system clock cycles, of a data block within the addressed track. Register 76 comes into action when a data block is split by a servo burst. In such case, a system clock count is loaded into register 76 that is equal to the portion (i.e.—number of sys clk cycles) of the split data block that immediately follows the servo burst.

A value from register 74 or register 76 is loaded into counter 72, in dependence upon the setting of multiplexer 78. When the value in register 76 is non-zero, that value will always be loaded into counter 72 (and at other times, the value in register 74 will be loaded). Not shown in FIG. 2 are a plurality of buffer registers that act as input buffers for each of counters 70 and 72 and registers 74 and 76. Those buffer registers enable the precise timing of the operations within the circuit of FIG. 2, but are not relevant to an understanding of the invention. Each of the counters and registers shown in FIG. 2 also has a sys clk input to provide operating synchronization and control.

Figure 3:
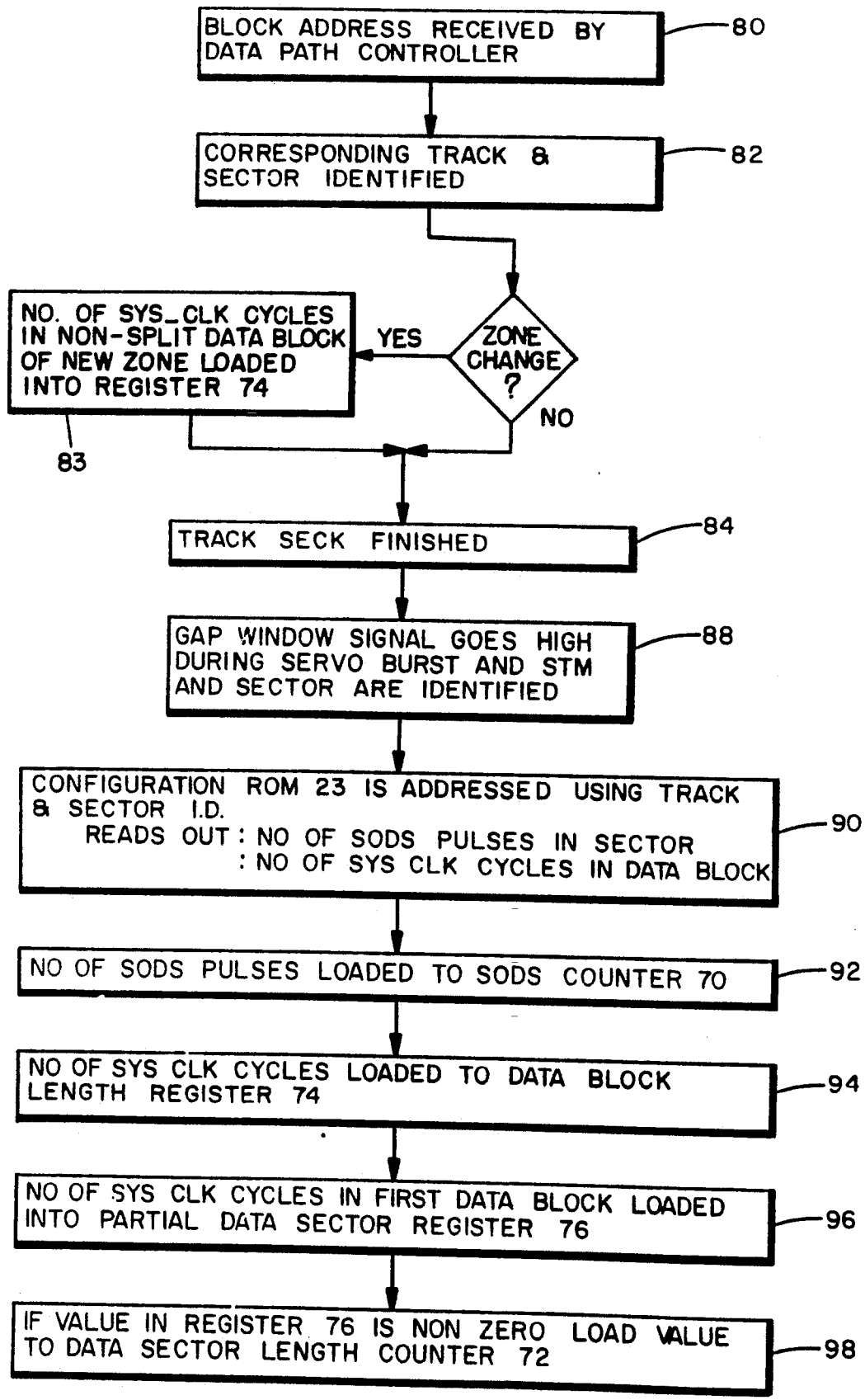
FIGS. 3 and 4 illustrate a flow diagram describing the operation of the data sector pulse generation circuitry shown in FIG. 2.
Figure 4:
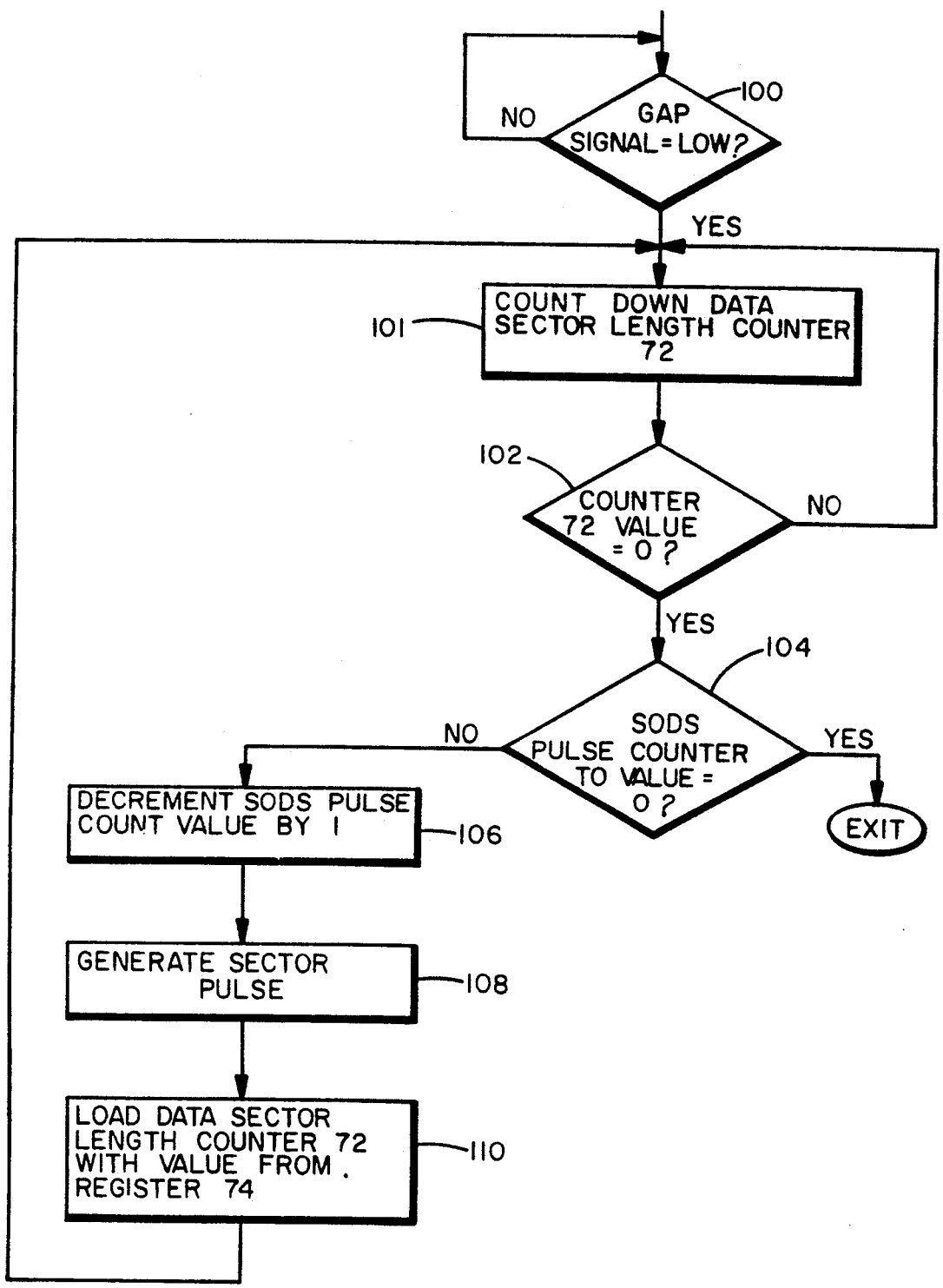

Turning now to FIGS. 3 and 4, the operation of the circuitry of FIGS. 1 and 2 that enables the generation of SODS pulses will be described. Initially, a block address is received from a host processor (FIG. 1) by data path controller 26 (box 81) and is fed via system data bus 50 to system microprocessor 22. There, the block address is converted to a disk track and sector (box 82), and a command is transmitted to Digital Signal Processor 24 to perform a track seek operation. If the seek operation desired will produce a data recording zone change then register 74 is loaded with the updated number of system clock cycles in a complete non-split data block. If the seek does not require a data recording zone change then the seek is initiated without any modifications to the SODS pulse generation hardware. Once the track seek operation is accomplished (box 84), and the next servo burst passes under the read/write transducer the GAP window is asserted high to window the servo burst and a sector timing mark is found that identifies the desired sector (box 88).

During GAP "high" time, configuration ROM 23 is addressed using the track and sector identifiers (box 90). Configuration ROM 23 responds by reading out the number of SODS pulses in the identified sector and the number of system clock cycles in the split data block that immediately follows the servo gap. The number of SODS pulses is loaded to counter 70 and the number of sys clk cycles in the split data block is loaded to register 76 (box 94).

The value in register 76 is checked. If zero then the value contained in register 74 is loaded into counter 72. If non-zero the value in register 76 is loaded into counter 72.

At this stage, a value has been loaded into counter 70 indicative of the number of SODS pulses in the addressed sector; a value has been loaded into register 74 that is equal to the number of sys clk cycles in a non-split data block within the track; and a value has been loaded into register 76 that is indicative of the number of sys clk cycles in a partial data block (if any) at the beginning of the data sector.

After the indicated values have been loaded into the counters/registers, the GAP signal is tested to determine if it is asserted low (decision box 100, FIG. 4). If not, the monitoring continues. If yes, a command is issued by state machine 60, via control bus 80, to counter 72 to begin counting down from the value inserted therein (box 101). The value in counter 72 is subsequently tested to determine if it is equal to zero (decision box 102), indicating the end of a data block. If no, the countdown procedure continues. If the value is found to equal zero (yes), the SODS count value in counter 70 is tested (decision box 104) to determine if the value is equal to zero. If yes, there are no further data blocks that commence within the data sector and the procedure is finished.

As can thus be seen, the invention enables the generation of a SODS pulse at the commencement of each data sector, even if that data sector is split by an intervening servo burst. Each SODS pulse is employed by data path controller 26 to enable the passage of data from read/write apparatus 10 (via read channel 12) to the host computer. If the system is in the write phase, a SODS pulse is employed to enable commencement of a write action to the desired data sector.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A disk drive system employing uniform size data blocks, a disk in said disk drive system having a sectorized format, each sector including at least one servo burst, each said data block exhibiting a constant data density across a plurality of disk tracks of differing radii, said system comprising:

read/write means for accessing both servo signals and data signals in each disk sector;

servo means responsive to servo signals fed from said read/write means for generating a synchronizing signal;

data sector pulse generating means responsive to said synchronizing signal to provide to said read/write means, a start of data sector pulse for each block of data commencing in a data sector and including means for enabling the generation of a next start of data sector pulse when any block of data is split by a servo burst, said next start of data sector pulse generated after the duration of said servo burst and the duration of a partial data block that follows said servo burst.

2. The disk drive system as recited in claim 1 wherein said read/write means is responsive to a start of data sector pulse to either read or write a data block.

3. The disk drive system as recited in claim 1, further comprising:

memory means for storing for a sector, a first value corresponding to a time length of a data block portion in said sector, said data block split by a servo burst and a second value corresponding to a number of data blocks that start in said sector, said data sector pulse generating means responsive to said stored values to enable generation of start of data sector pulses in said sector.

4. The disk drive system as recited in claim 3, further comprising:

processor means responsive to a received data block address to cause said read/write means to access a disk track that includes an addressed data block and to further cause a read-out from said memory means of stored first and second values for a track and sector containing said addressed data block.

5. The disk drive system as recited in claim 4 wherein said data sector pulse generating means further comprises:

a data block length register for receiving a value corresponding to a time length of a full data block in an identified disk track;

a start of data sector pulse counter for receiving said second value from said memory means for a sector in said identified disk track;

a data sector length register for receiving said first value for a split data block at the commencement of said data sector in said identified data track; and a data sector length counter that is set to the value of said data sector length register if said value is non-zero and if said value is equal to zero, to the first value from said data block length register; and means for causing said data sector length counter to count down to zero to enable the generation of a start of data sector pulse.

6. The disk drive system as recited in claim 5 wherein said data sector pulse generating means further comprises:

a state machine responsive to a zero count from said data sector length counter to generate said start of data sector pulse.

7. The disk drive system as recited in claim 6 wherein said data sector pulse generating means further comprises:

multiplexer means responsive to an output from said state machine to control the value loaded into said data sector length counter.

* * * * *